US008995088B1

(12) United States Patent
Boone et al.

(10) Patent No.: US 8,995,088 B1
(45) Date of Patent: Mar. 31, 2015

(54) HEAT SINK FOR A SPIN TORQUE OSCILLATOR (STO) IN MICROWAVE ASSISTED MAGNETIC RECORDING (MAMR)

(71) Applicant: HGST Netherlands B.V., Amsterdam (NL)

(72) Inventors: Carl Boone, Newbury Park, CA (US); Jianhua Li, Sagamihara (JP); Isao Nunokawa, Odawara (JP); Erhard Schreck, San Jose, CA (US); Mikito Sugiyama, Odawara (JP); Ikuya Tagawa, Hiratsuka (JP); Yuta Udo, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/060,504

(22) Filed: Oct. 22, 2013

(51) Int. Cl.
*G11B 5/127* (2006.01)
*G11B 5/40* (2006.01)
*G11B 5/00* (2006.01)

(52) U.S. Cl.
CPC ...... *G11B 5/40* (2013.01); *G11B 5/127* (2013.01); *G11B 2005/0024* (2013.01)
USPC .................................................. 360/125.32

(58) Field of Classification Search
USPC .................................................. 360/125.32
See application file for complete search history.

(56) References Cited

U.S. PATENT DOCUMENTS

| 7,471,491 B2 * | 12/2008 | Sato et al. .................. 360/313 |
| 8,064,246 B2 | 11/2011 | Slonczewski |
| 2005/0225897 A1 * | 10/2005 | Liu et al. .................... 360/126 |
| 2009/0065177 A1 | 3/2009 | Ouyang |
| 2010/0110592 A1 | 5/2010 | Koui et al. |
| 2010/0134922 A1 | 6/2010 | Yamada et al. |
| 2011/0273800 A1 | 11/2011 | Takano et al. |
| 2012/0069465 A1 | 3/2012 | Sato et al. |
| 2012/0154952 A1 | 6/2012 | Yamada et al. |

FOREIGN PATENT DOCUMENTS

| JP | 2010150351 | 7/2010 |
| JP | 2011124574 | 6/2011 |
| JP | 2011187092 | 9/2011 |
| JP | 201214783 | 1/2012 |

* cited by examiner

*Primary Examiner* — Mark Blouin
(74) *Attorney, Agent, or Firm* — Zilka-Kotab, PC

(57) ABSTRACT

In accordance with one embodiment, a magnetic head includes a main pole configured to emit a recording magnetic field for affecting a magnetic medium, a spin torque oscillator (STO) device in electrical communication with and positioned above the main pole in a track direction, the STO device being configured to generate a high-frequency magnetic field which is superimposed with the recording magnetic field in order to record data to the magnetic medium when current flows to the STO device, and a heat sink positioned near the STO device, the heat sink being configured to reduce a temperature of the STO device when current flows to the STO device. In another embodiment, a method includes forming a heat sink behind a STO device in an element height direction perpendicular to a media facing surface, and/or on both sides of the STO device in a cross-track direction at the media facing surface.

20 Claims, 15 Drawing Sheets

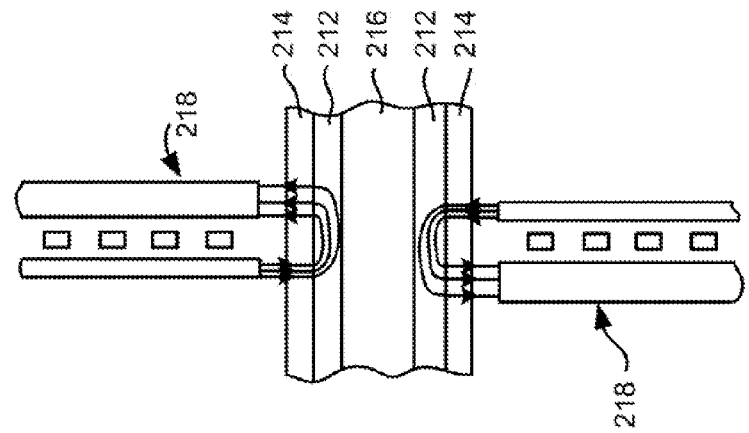
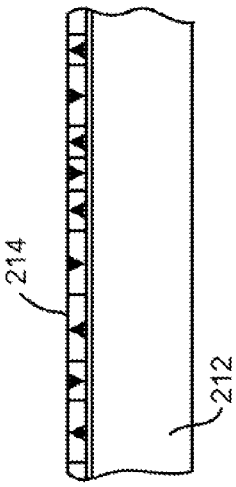
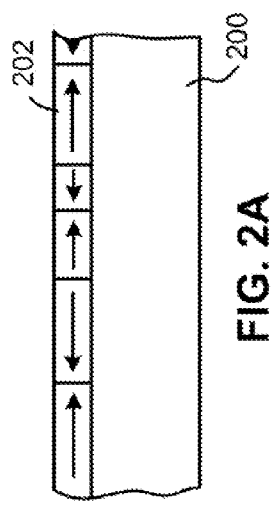
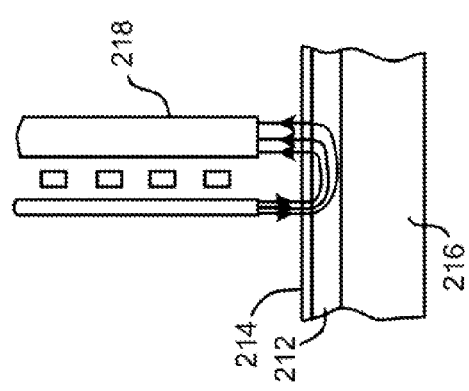
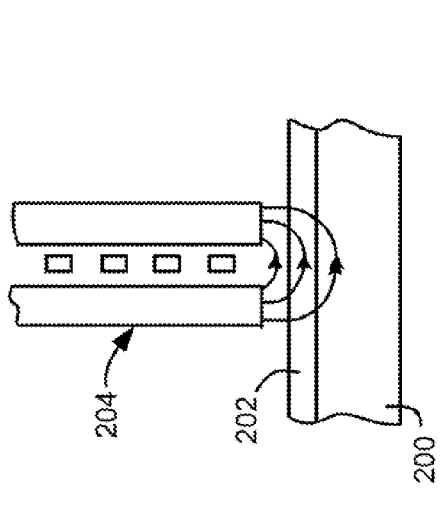

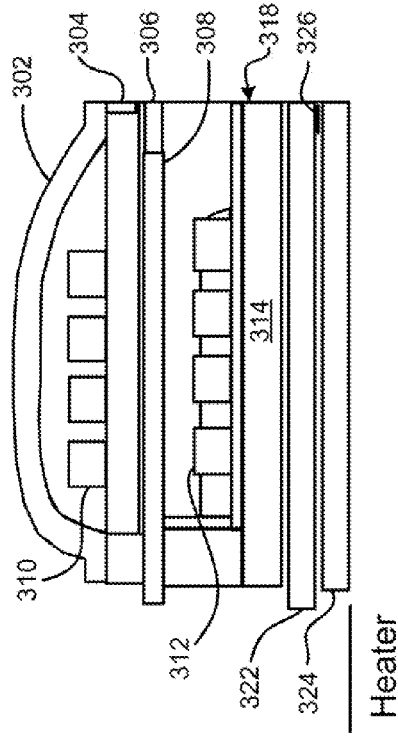
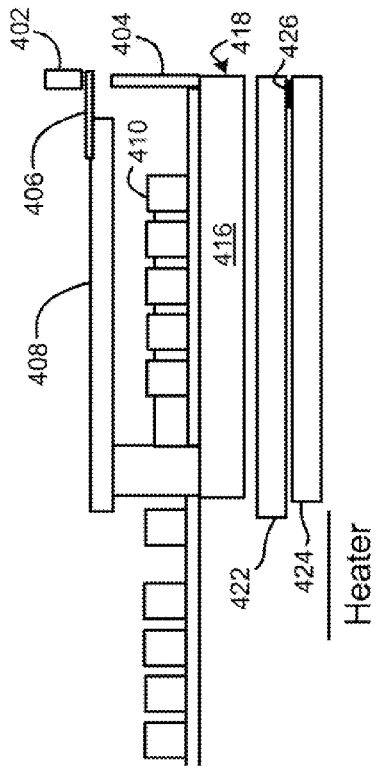
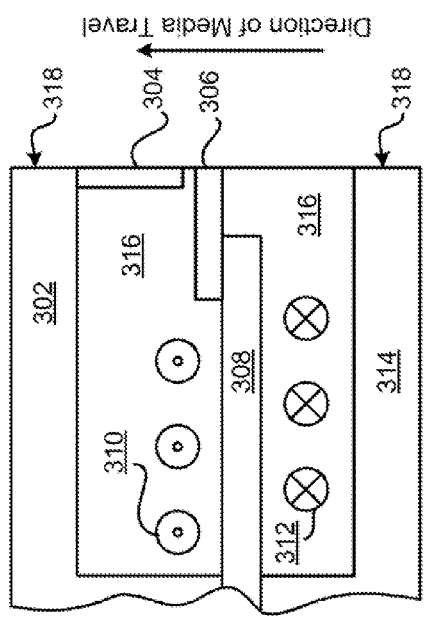
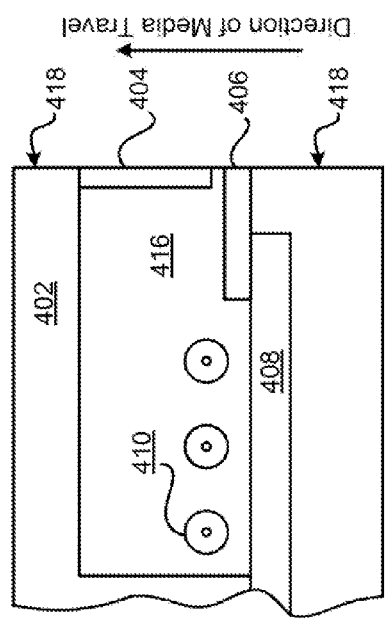

HEAT SINK FOR A SPIN TORQUE OSCILLATOR (STO) IN MICROWAVE ASSISTED MAGNETIC RECORDING (MAMR)

FIELD OF THE INVENTION

The present invention relates to magnetic heads, and more particularly, this invention relates to a heat sink for a spin torque oscillator (STO) that may be used in microwave assisted magnetic recording (MAMR).

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

One method of recording which is capable of utilizing smaller components is referred to as microwave assisted magnetic recording (MAMR). For MAMR, a spin torque oscillator (STO) element or device is located next to or near the write element in order to produce a high-frequency oscillating magnetic field (in addition to a recording magnetic field emanated from a main pole of the write element) which reduces an effective coercivity of a recording medium used to store data.

In order to produce this high-frequency rotating or oscillating magnetic field with the STO, a very high current density (such as a current density on the order of $1 \times 10^8$ A/cm$^2$) is passed through the STO device. Typically, a STO has a relatively small size, about the size of a read element, and a current much larger than that passed through the read element may be passed through the STO. Assuming typical dimensions and operating parameters for the STO, the temperatures reported in Table 1, below, are expected to be produced within the STO device upon passing current therethrough. The STO maximum temperatures depend on current density and thermal properties of all materials of the STO and in the path of the current. Table 1 shows two cases of STOs, STO1 and STO2, with write elements having different magnetic materials having different thermal properties, e.g., thermal conductivities of 25 and 80 W/in K, respectively.

TABLE I

| Case | Thermal Conductivity [W/(m·K)] | STO $T_{max}$ [°C.] | STO $R_{avg}$ [Ohm] | STO Power [mW] | Applied Voltage [V] | Total Current [A] | Current Density [A/cm$^2$] | STO $V_{avg}$ [V] |
|---|---|---|---|---|---|---|---|---|
| STO1 | 25 | 239 | 75.4 | 0.51 | 0.2 | 0.0026 | $1.04 \times 10^8$ | 0.196 |
| STO2 | 80 | 121 | 65.6 | 0.59 | 0.2 | 0.003 | $1.20 \times 10^8$ | 0.197 |

The temperatures for STO1 and STO2, 239° C. and 121° C., respectively, are high enough to lead to reliability issues over the lifetime of a magnetic recording device employing the STOs, which may be considered to be anywhere from three to five years. It is undesirable to have the STO be a limiting factor in the reliability of a MAMR device.

SUMMARY

In one embodiment, a magnetic head includes a main pole configured to emit a recording magnetic field for affecting a magnetic medium, a STO device in electrical communication with and positioned above the main pole in a track direction, the STO device being configured to generate a high-frequency magnetic field which is superimposed with the recording magnetic field in order to record data to the magnetic medium when current flows to the STO device, and a heat sink positioned near the STO device, the heat sink being configured to reduce a temperature of the STO device when current flows to the STO device.

In another embodiment, a method for forming a magnetic head includes forming a main pole configured to emit a recording magnetic field for affecting a magnetic medium, forming a STO device above the main pole in a track direction, the STO device being in electrical communication with the main pole, and forming a heat sink near to the STO device configured to reduce a temperature of the STO device when current flows to the STO device, the heat sink being formed behind the STO device in an element height direction perpendicular to a media facing surface of the magnetic head, and/or on both sides of the STO device in a cross-track direction at the media facing surface of the magnetic head.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. As previously described, high temperatures in a spin torque oscillator (STO) of a microwave assisted magnetic recording (MAMR) device may lead to reliability issues over the lifetime of the MAMR device. Accordingly, it would be beneficial to somehow reduce the temperatures experienced at the STO in a way that does not affect the STO's functionality, but allows a reduced operating temperature in order to increase the usable lifetime of devices which employ the STO for MAMR.

In one general embodiment, a magnetic head includes a main pole configured to emit a recording magnetic field for affecting a magnetic medium, a STO device in electrical communication with and positioned above the main pole in a track direction, the STO device being configured to generate a high-frequency magnetic field which is superimposed with the recording magnetic field in order to record data to the magnetic medium when current flows to the STO device, and a heat sink positioned near the STO device, the heat sink being configured to reduce a temperature of the STO device when current flows to the STO device.

In another general embodiment, a method for forming a magnetic head includes forming a main pole configured to emit a recording magnetic field for affecting a magnetic medium, forming a STO device above the main pole in a track direction, the STO device being in electrical communication with the main pole, and forming a heat sink near to the STO device configured to reduce a temperature of the STO device when current flows to the STO device, the heat sink being formed behind the STO device in an element height direction perpendicular to a media facing surface of the magnetic head, and/or on both sides of the STO device in a cross-track direction at the media facing surface of the magnetic head.

Figure 1:
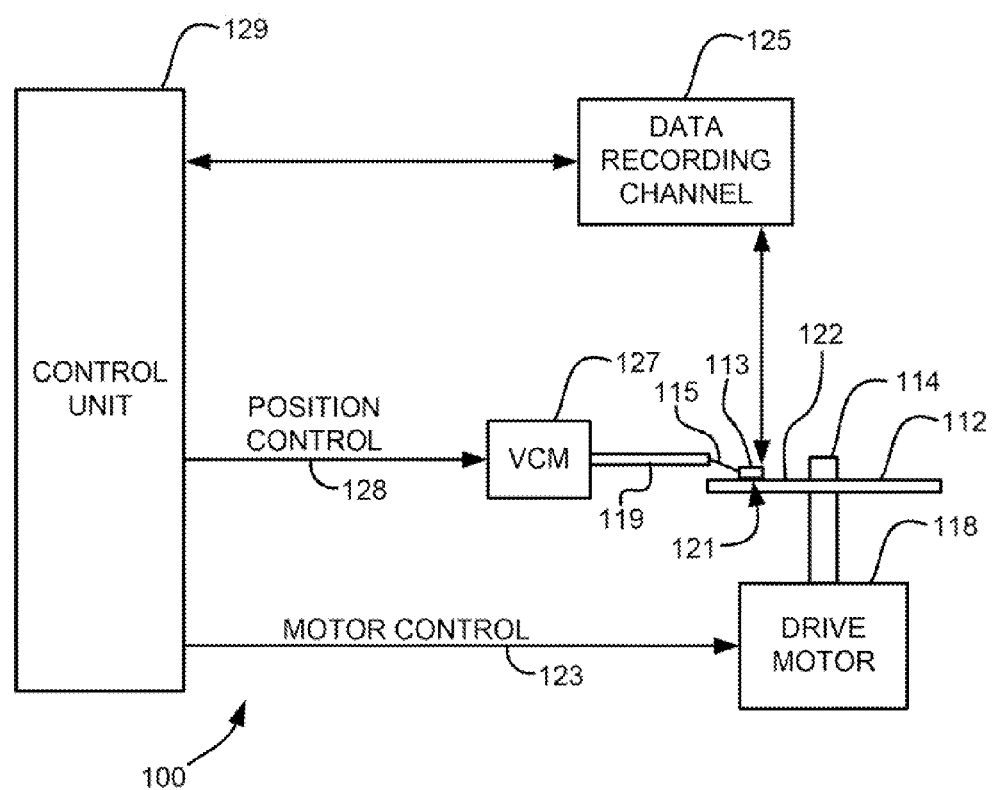
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a drive mechanism, which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil.

Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Some attempts have been made to supply a heat sink with a MAMR head utilizing a STO. However, these structures typically have a heat sink positioned on both sides of the main magnetic pole in a cross-track direction, such as in JP 2010-150351. When both the sides of the main magnetic pole are used as a heat sink, it is impossible to have a side shield, and therefore there is a possibility of cross-talk when recording to a magnetic medium by the write element or for the oscillating magnetic field to leak from the STO to portions of the magnetic medium where it is undesirable to have the high-frequency magnetic field. Moreover, in JP 2012-14783, a structure is described having a heat sink positioned between the main magnetic pole and a trailing shield, e.g., within the trailing shield (TS) gap. If a heat sink is positioned within the TS gap, it may extend the TS gap interval and may inhibit the ability to store data with a high density.

According to embodiment, a heat sink may be provided in a circumference of a track direction of a STO along an element height direction. With this arrangement, it is not necessary to change the structure of a conventional write head. Moreover, it is not necessary to extend the interval of the TS gap. Therefore, it becomes possible to suppress generation of heat within and around the STO. In fact, according to some calculated results, a 25° C. reduction in heat rise is able to be achieved as a maximum, with an assumed heat sink composed of Cu having a size of 40 μm wide by 3 μm high by 30 nm thick. Width is measured in the cross-track direction, height is measured in the element height direction (perpendicular to the ABS), and thickness is measured in a film thickness direction.

The effectiveness of a simple heat sink made of Au in a MAMR head has been tested. Any suitable material may be used to form the heat sink, such as Cu, Au, Ag, Al, diamond, graphene, graphite, or any other suitable metal, metal alloy, or combination thereof. From a cost and production standpoint, Au has been chosen to be used in the exemplary heat sink used in testing.

In a modeled example of a MAMR head where the heat sink is positioned adjacent the STO, the temperature in and around the STO may be reduced from 181° C. down to 157° C. (a resultant 13% drop in temperature). 13% is sufficient to provide noticeable improvement in reliability of a MAMR head.

Other more complicated heat sink structures may be used, but have been modeled to result in similar heat reduction contributions, but not any greater heat reduction. So in general, it is difficult to heat sink the STO structure without affecting its functionality, and therefore a simpler structure is better.

In another embodiment, the heat sink may be positioned away from the STO device while still providing heat reduction. In this structure, the heat sink was positioned 20 nm away from the STO, and the maximum temperature in and around the STO was calculated to be 167° C. as compared to the head that did not have a heat sink that reached a maximum temperature of 181° C. Accordingly, a temperature reduction of 13° C., or 7.2%, was determined to be possible with a heat sink positioned away from the STO.

Modeling for the effectiveness of a heat sink for STO heat dissipation has resulted in several observations. It is possible to reduce the STO temperature by adding additional heat sink material which does not affect the proper and efficient functioning of the STO. This is possible as long as the heat sink material does not shunt a majority of the current flowing to the STO. However, it is possible to shunt some of the current flowing to the STO and still have a viable write head with additional temperature reduction of the STO due to the shunting.

In addition, another benefit of the structures disclosed herein, according to various embodiments, is that reduced temperature of the STO also reduces a potential thermal protrusion of the STO beyond the ABS. Though expected to be small and of the order of less than about 1 nm, any protrusion of the STO beyond the ABS is undesired in magnetic heads, particularly with heads that will be used that have a clearance of less than about 1 nm.

Figure 5A:
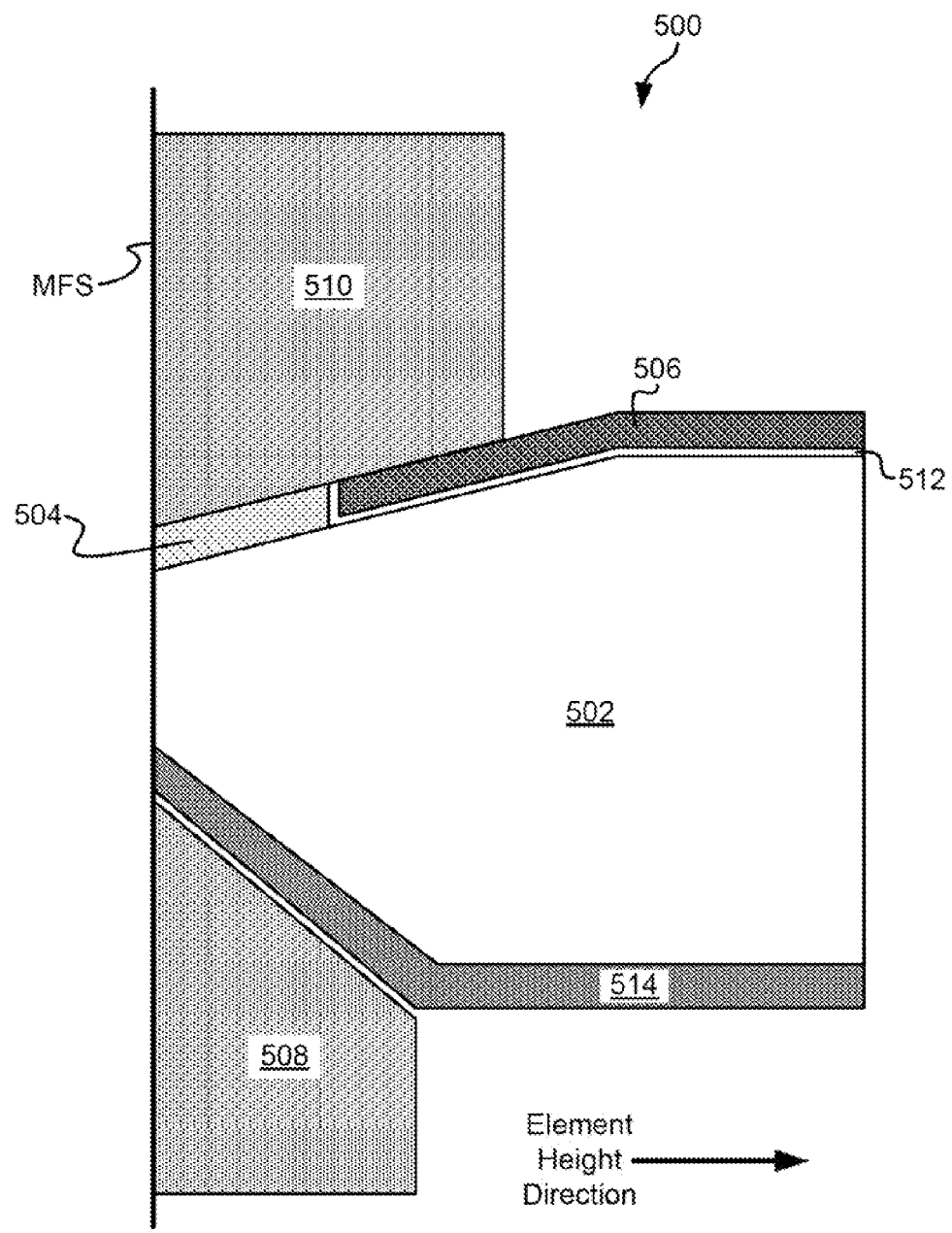
FIG. 5A shows a side view of a first embodiment of a magnetic head.
Figure 5B:
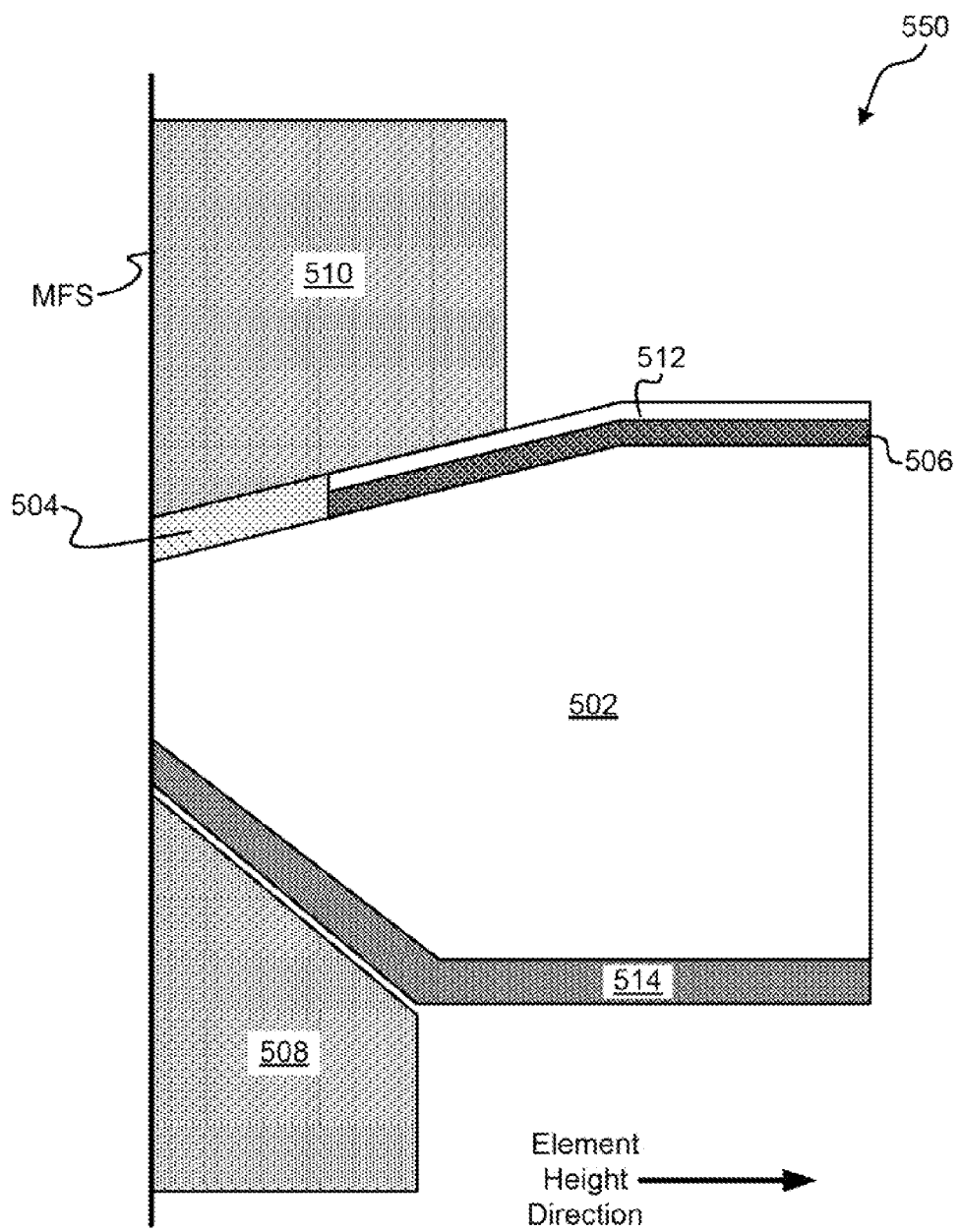
FIG. 5B shows a side view of a second embodiment of a magnetic head.
Figure 5C:
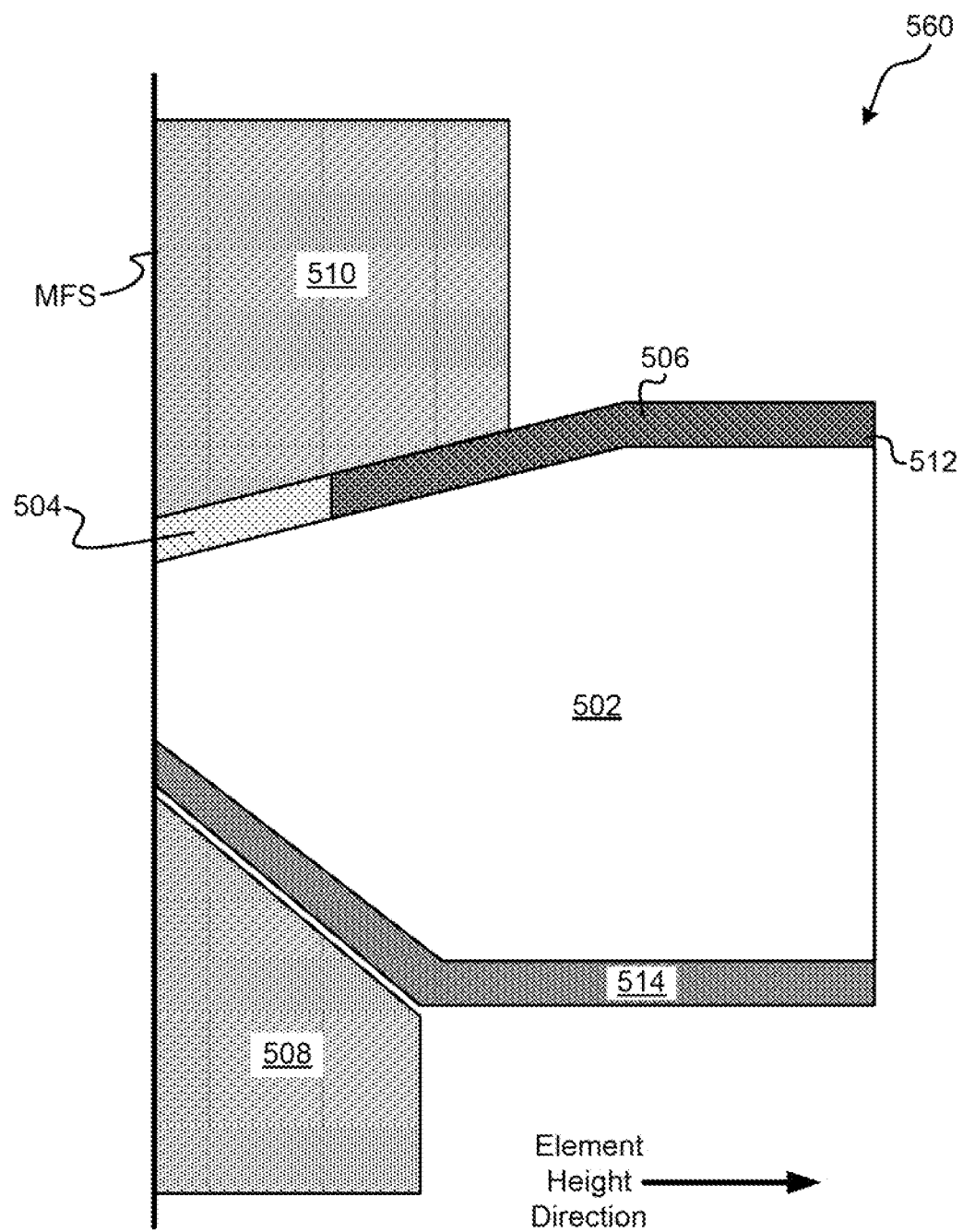
FIG. 5C shows a side view of a third embodiment of a magnetic head.
Figure 5D:
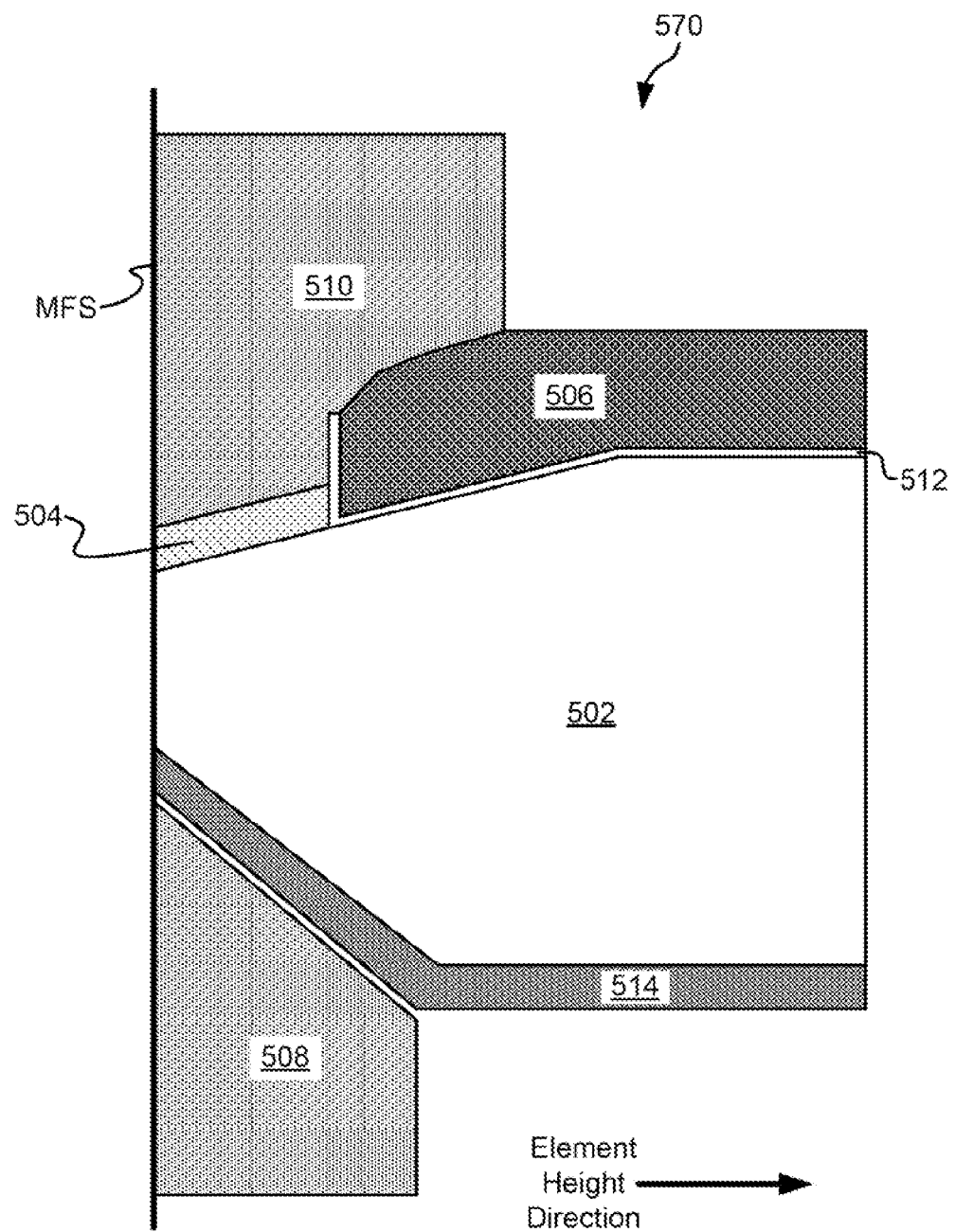
FIG. 5D shows a side view of a fourth embodiment of a magnetic head.
Figure 5E:
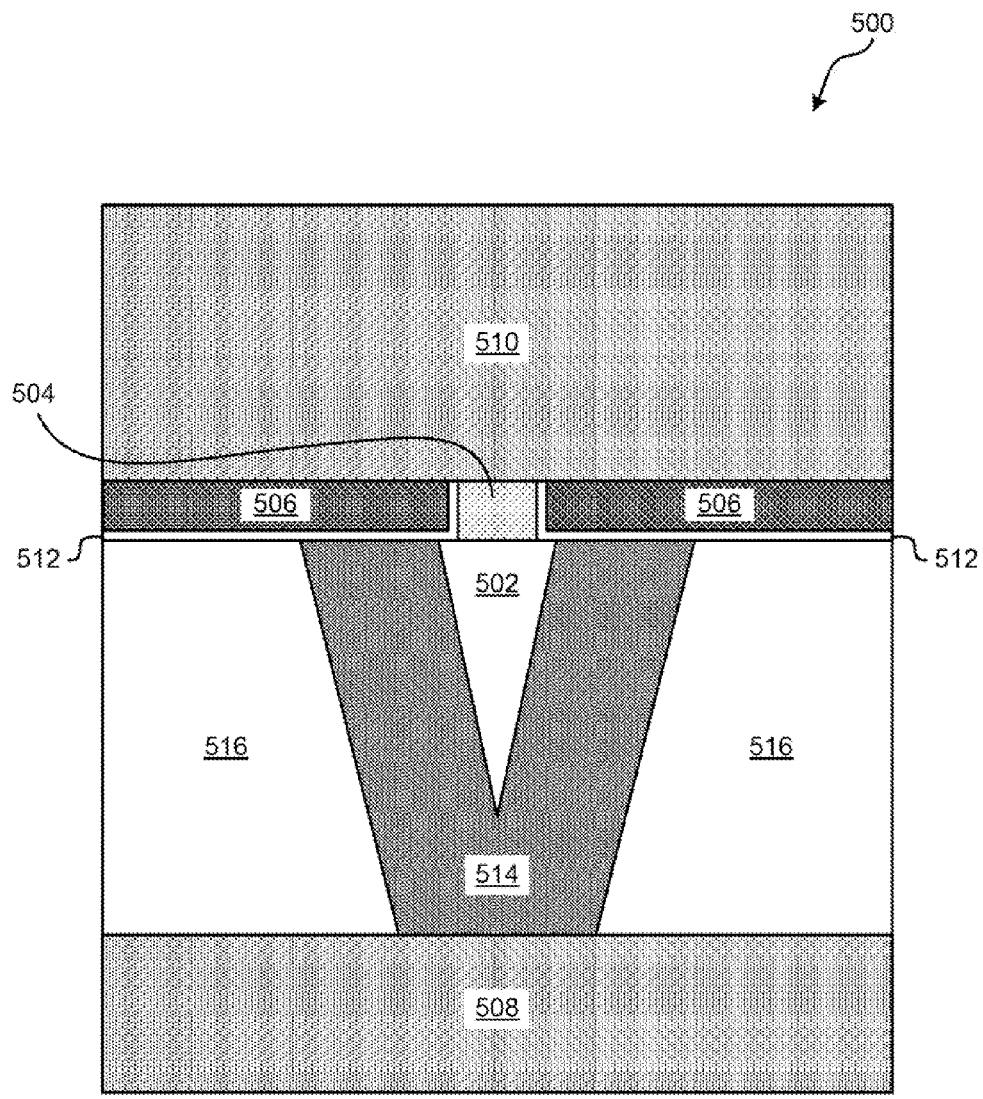
FIG. 5E shows a view of the first embodiment of a magnetic head from a media facing surface thereof.
Figure 5F:
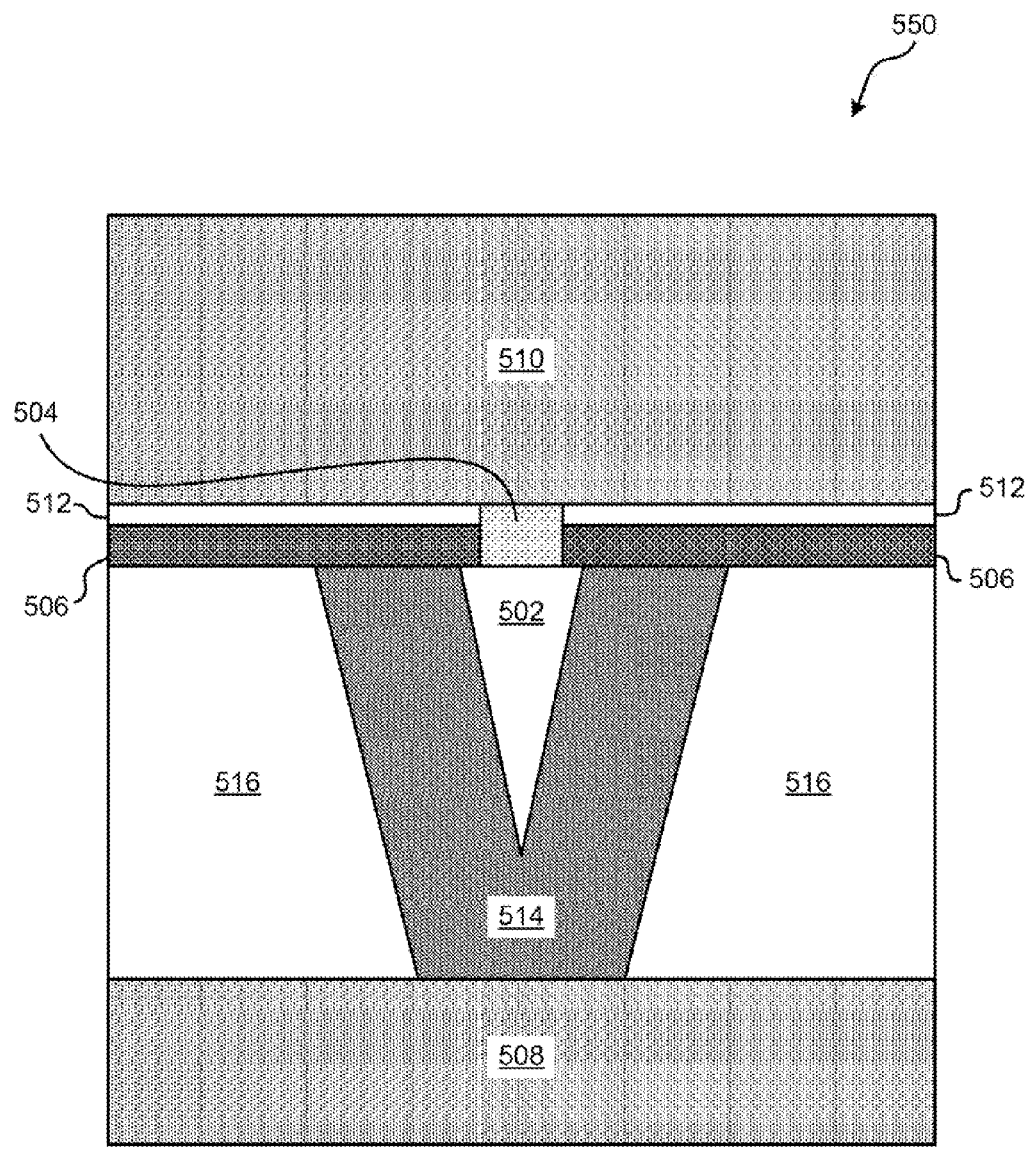
FIG. 5F shows a view of the second embodiment of a magnetic head from a media facing surface thereof.
Figure 5G:
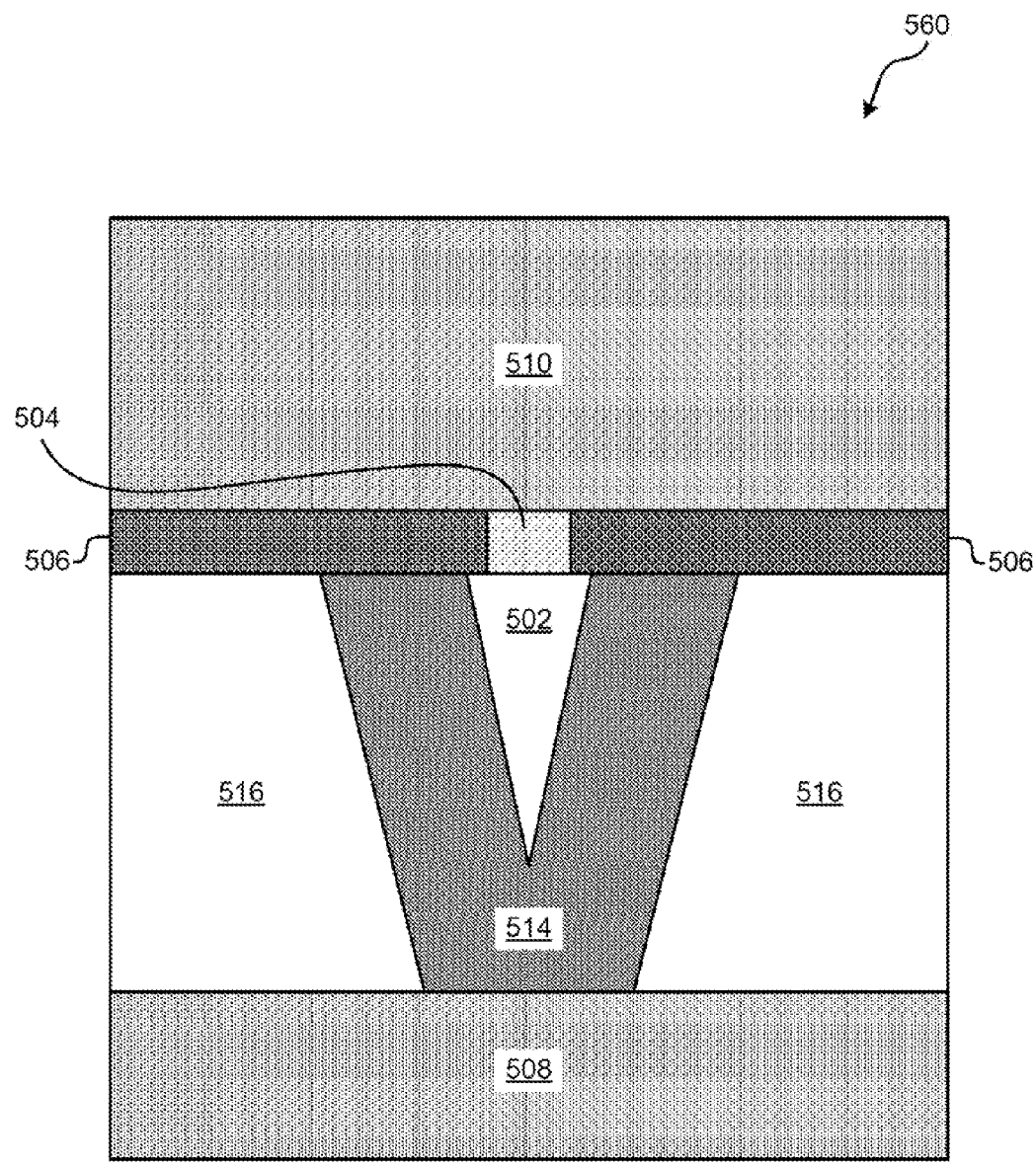
FIG. 5G shows a view of the third embodiment of a magnetic head from a media facing surface thereof.
Figure 5H:
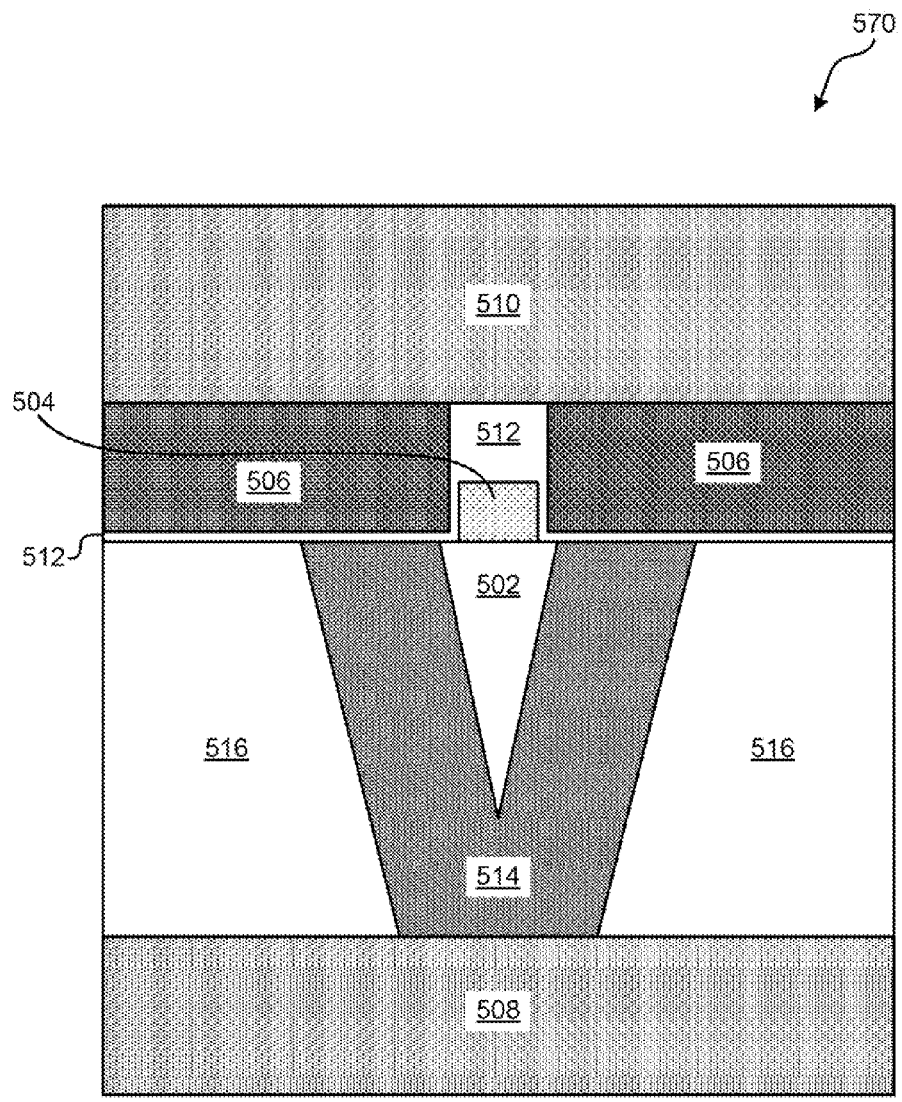
FIG. 5H shows a view of the fourth embodiment of a magnetic head from a media facing surface thereof.

FIG. 5A shows a side view of a first embodiment of a magnetic head 500, while FIG. 5E shows a media facing surface (MFS) view of the first embodiment of the magnetic head 500. Similarly, FIGS. 5B and 5F show a side view and media facing surface-view of a second embodiment of a magnetic head 550, FIGS. 5C and 5G show a side view and media facing surface-view of a second embodiment of a magnetic head 560, and FIGS. 5D and 5H show a side view and media facing surface-view of a fourth embodiment of a magnetic head 570. FIGS. 5E-5H each show a main pole 502 having a gap 514 (which may comprise Ru or some other suitable material) and side shields 516 positioned in the cross-track direction on both sides of the main pole 502. Any suitable material may used for the gap 514 and side shields 516 as would be understood by one of skill in the art.

As shown in FIGS. 5A and 5E, a magnetic head 500 (specifically a MAMR head) is shown according to one embodiment. The magnetic head 500 includes a main pole 502 configured to emit a recording magnetic field for affecting a magnetic medium—not shown, but positioned to the left of the media facing surface—an STO device 504 in electrical communication with and positioned above the main pole 502 in a track direction, and a heat sink 506 positioned near the STO device 504. The main pole 502 may comprise any suitable material known in the art, such as CoFe, NiFe, etc.

In one embodiment, the magnetic head 500 may comprise a trailing shield 510 positioned above the STO device 504 in the track direction, the trailing shield 510 being configured to act as an electrode for the STO device 504. In another embodiment, the magnetic head 500 may include a leading edge shield 508 positioned below the main pole 502 in the track direction. Any suitable material known in the art may be used for the trailing shield 510 and/or the leading edge shield 508. In another embodiment, an insulating layer 514 may be provided below the main pole 502 between the main pole 502 and the leading edge shield 508.

The STO device 504 is configured to generate a high-frequency magnetic field which is superimposed with the recording magnetic field in order to record data to the magnetic medium when current flows to the STO device 504. Also, the heat sink 506 is configured to reduce a temperature of the STO device 504 when current flows to the STO device 504.

The heat sink 506 is separated from at least one or layer (such as the STO device 504) by an insulating layer 512. In the embodiment shown in FIGS. 5A and 5E, the insulating layer 512 is positioned on both sides of the STO device 504 in a cross-track direction at the media facing surface of the magnetic head 500. Moreover, the insulating layer 512 is positioned behind the STO device 504 relative to the media facing surface in the element height direction perpendicular to the media facing surface of the magnetic head 500.

Furthermore, the insulating layer 512 may be configured to electrically insulate the main pole 502 from an electrode (such as a trailing shield 510) positioned above the STO device 504 in the track direction. In another embodiment, the insulating layer 512 may be configured to electrically insulate the main pole 502 from the heat sink 506.

In addition, in various approaches, the insulating layer may be positioned between the STO device 504 and the heat sink 506 (as shown in FIGS. 5A, 5D, 5E, and 5H), between the main pole 502 and the heat sink 506 (as shown in FIGS. 5A, 5D, 5E, and 5H), and/or between the electrode (such as the trailing shield 510) and the heat sink 506 (as shown in FIGS. 5B and 5F).

The heat sink 506 may comprise a metal, metal alloy, and/or an insulating material capable of providing heat dissipation to the STO device 504. For example, a single layer or laminated multi-layer structure may be used, the layer(s) comprising any of Ag, Cu, Au, Al, Fe, Mg, W, Rh, Ru, Co, Zn, Ni, Pt, Cr, Ti, Mn, diamond, diamond-like carbon (DLC), and/or graphene. Furthermore, the laminated multi-layer structure may include a metal material and any of the above mentioned materials. Moreover, any suitable insulating material or nonmagnetic material, such as one or more of $TiO_2$, TiN, $Al_2O_3$, AlN, $SiO_2$, $Si_3N_4$, SiC, etc., may be used alone or in combination with one or more metal and/or metal-alloy layers.

Now referring to FIGS. 5B and 5F, an embodiment of a magnetic head 550 is shown where the insulating layer 512 is positioned above the heat sink 506 between the heat sink 506 and the trailing shield 510 (which is being used as an electrode). In this embodiment, the insulating layer 512 may provide a bump such that the electrical path between the main pole 502 and the trailing shield 510 must maneuver around the insulating layer 512.

Now referring to FIGS. 5C and 5G, an embodiment of a magnetic head 560 is shown where the heat sink 506 is positioned in contact with the STO device 504. This placement adjacent the STO device 504 causes a small current bypass away from the STO device 504, but it will not affect the function and performance of the magnetic head 560 as long as it is not bypassing the current that contributes to the spin polarization effect. Furthermore, the heat sink 506 is shown positioned adjacent the STO device 504 on both sides of the STO device 504 in the cross-track direction, and behind the STO device 504 in the element height direction. In another approach, the heat sink 506 may be constructed of an insulating material.

As shown in FIGS. 5D and 5H, according to one embodiment, the heat sink 506 for the magnetic head 570 may have a deposition thickness that is greater than a deposition thickness of the STO device 504. In this embodiment, the heat sink 506 may be formed from a suitable insulating material or nonmagnetic material, such as one or more of $TiO_2$, TiN, $Al_2O_3$, AlN, $SiO_2$, $Si_3N_4$, SiC, etc. Furthermore, the insulating layer 512 may be positioned between the heat sink 506 and both the main pole 502 and the STO device 504.

In some approaches, a MAMR head as shown in FIGS. 5A-5H may be used in a magnetic data storage system. The magnetic data storage system may be similar to that shown in FIG. 1. For example, the magnetic data storage system 100 may comprise at least one magnetic head 121 as described according to any embodiment herein, a magnetic medium (disk) 112, a drive mechanism 118 for passing the magnetic medium (disk) 112 over the at least one magnetic head 121, and a controller 129 electrically coupled to the at least one magnetic head 121 for controlling operation of the at least one magnetic head 121.

Figure 6B:
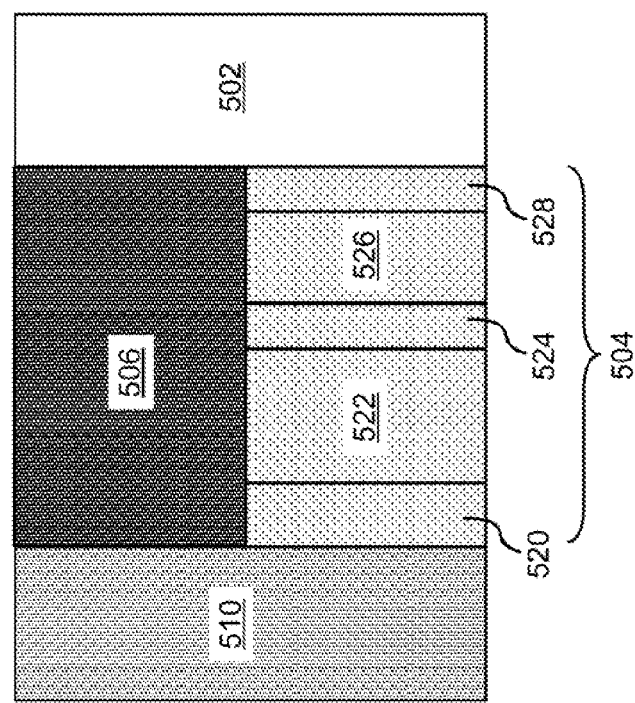
FIG. 6B shows a close-up view of a spin torque oscillator (STO) device from Circle A in FIG. 6A, according to one embodiment.
Figure 6A:
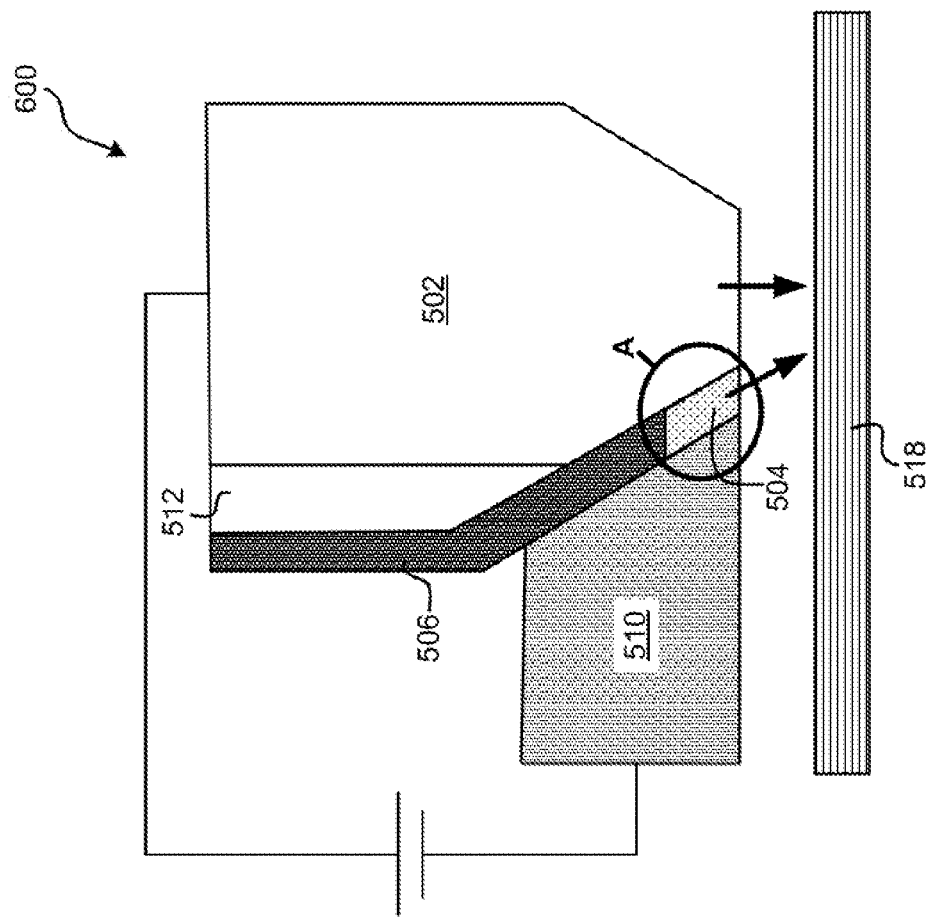
FIG. 6A shows a side view of a magnetic head, according to one embodiment.

FIG. 6A shows a side view of a magnetic head 600, according to one embodiment. As can be seen, the writing magnetic field emanating from the main pole 502 superimposes with the high frequency magnetic field emanated from the STO device 504 to store data to the magnetic medium 518. Furthermore, the insulating layer 512 is shown with a bump structure, while the heat sink 506 maintains a thickness consistent with that of the STO device 504. The circuit from the main pole 502, through the STO device 504, and through the trailing shield 510 is also shown.

FIG. 6B shows a close-up view of the STO device from Circle A in FIG. 6A, according to one embodiment. As shown, the STO device 504 includes a seed layer 528, a reference layer 526, a conductive layer 524 (such as Cu or some other conductive material), a field generation layer 522, and a cap layer 520, formed successively from the main pole 502 to the trailing shield 510 on a media facing surface side of the heat sink 506. Any suitable material known in the art may be used for the layers of the sTO device 504.

With reference to FIGS. 7A-7G, a method for formation of a MAMR head is shown according to one embodiment. The method may be implemented in any desired environment, and may include more or less steps than those described herein.

Figure 7D:
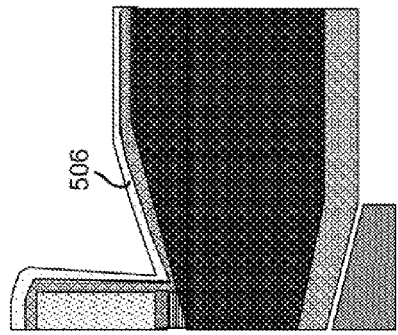
FIGS. 7A-7G show various steps of a formation process for a magnetic head according to one embodiment.
Figure 7C:
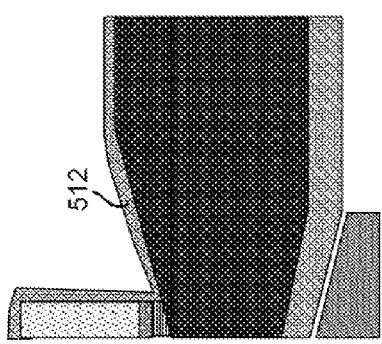
Figure 7B:
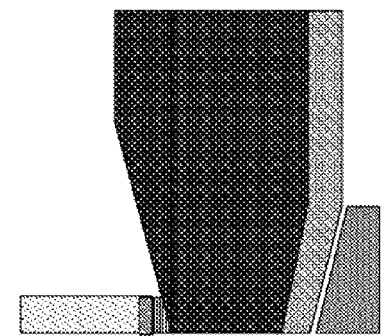
Figure 7A:
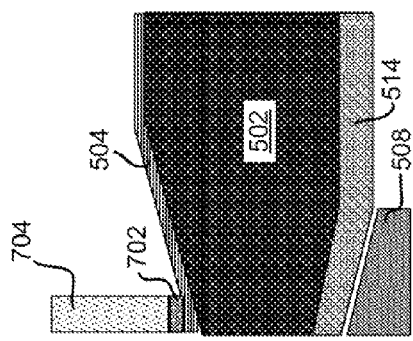
Figure 7G:
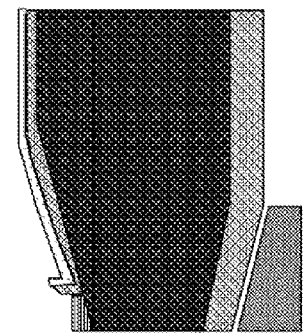
Figure 7F:
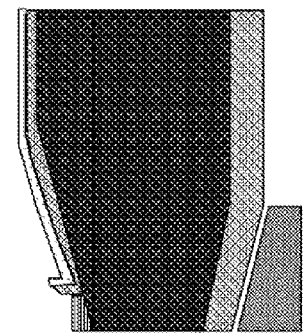

In FIG. 7A, a partially formed magnetic head is shown having a leading edge shield 508, an insulating layer 514, a main pole 502, a STO layer 504 thereabove, a release layer 702 (such as DLC) and a resist 704 formed above an area of the STO layer 504 having a size consistent with the resultant STO device. This structure is then etched, such as via reactive ion etching (RIE), to form the structure shown in FIG. 7B. Next, ion milling is performed for a short amount of time, and refill deposited with an insulating material to form the structure shown in FIG. 7C.

Figure 7E:
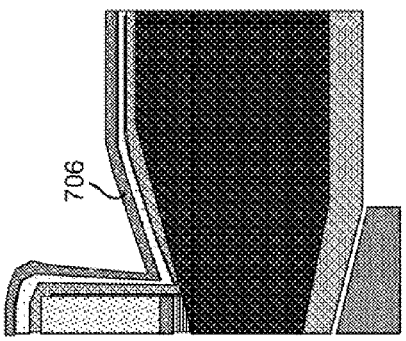

After the refill deposition, a metal or some other heat sink material 506 is deposited on the insulating material to form the structure shown in FIG. 7D, and then DLC or some other suitable material is formed above the heat sink material 506. Then, as shown in FIG. 7E, a chemical mechanical planarization liftoff process, or some other suitable liftoff, is performed to remove the resist 704 and release layer 702 thereunder to form the structure shown in FIG. 7F. Next, a second RIE step is performed to remove the various DLC layers to form the structure shown in FIG. 7G. Then, other layers may be formed on this structure, such as a trailing shield, etc.

Figure 8:
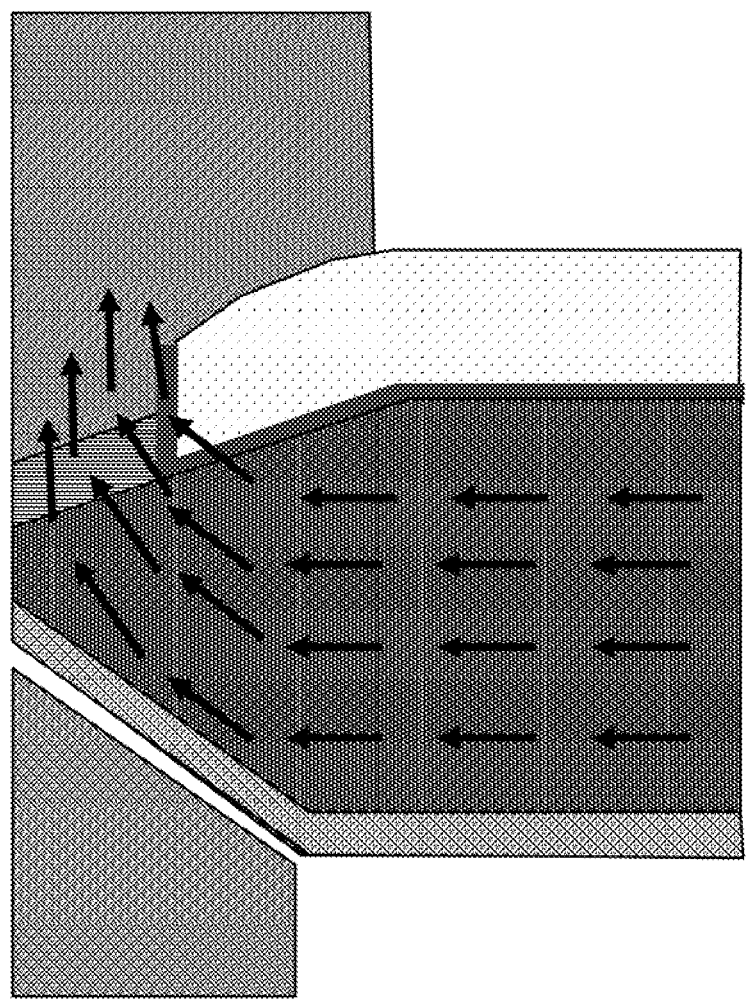
FIG. 8 shows effects of a bump structure on a magnetic head in one embodiment.

As shown in FIG. 8, the benefits of having a magnetic head with a bump are shown, where the electrical path (and magnetic path) between the main pole and trailing shield electrode is shown maneuvering around the insulating layer, an effect which is enhanced by the bump (heat sink or insulating material having a deposition thickness greater than a deposition thickness of the STO device).

With reference to FIGS. 9A-9G, a method for formation of a MAMR head is shown according to one embodiment. The method may be implemented in any desired environment, and may include more or less steps than those described herein.

Figure 9D:
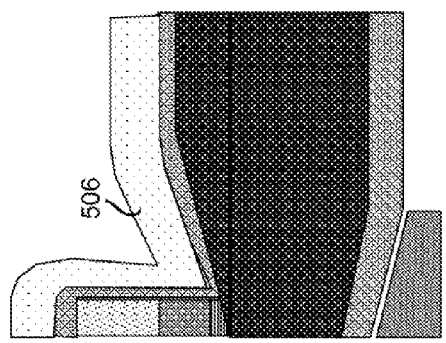
FIGS. 9A-9G show various steps of a formation process for a magnetic head according to one embodiment.
Figure 9C:
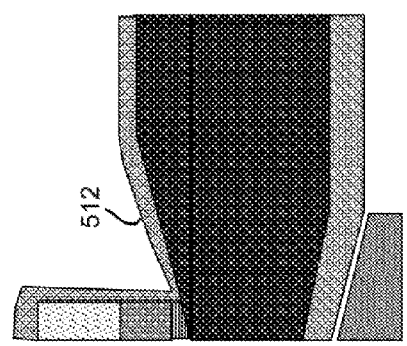
Figure 9G:
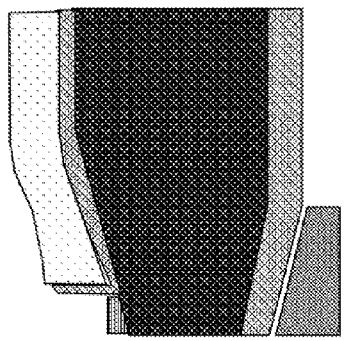
Figure 9B:
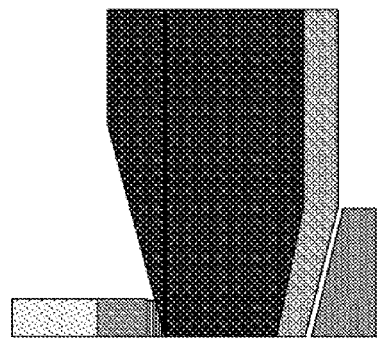
Figure 9F:
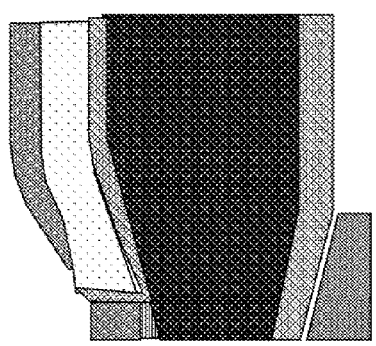
Figure 9A:
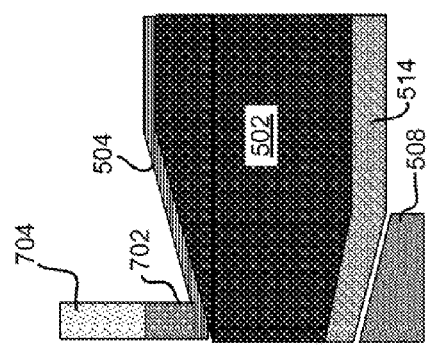

In FIG. 9A, a partially formed magnetic head is shown having a leading edge shield 508, an insulating layer 514, a main pole 502, a STO layer 504 thereabove, a release layer 702 (such as DLC) and a resist 704 formed above an area of the STO layer 504 having a size consistent with the resultant STO device. This structure is then etched, such as via reactive ion etching (RIE), to form the structure shown in FIG. 9B.

Next, ion milling is performed for a short amount of time, and refill deposited with an insulating material to form the structure shown in FIG. 9C.

Figure 9E:
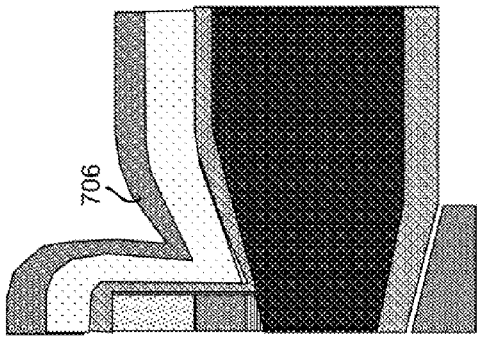

After the refill deposition, a metal or some other heat sink material 506 is deposited on the insulating material to a thickness greater than that of the STO device 504 to form the structure shown in FIG. 9D, and then DLC or some other suitable material is formed above the heat sink material 506. Then, as shown in FIG. 9E, a chemical mechanical planarization liftoff process, or some other suitable liftoff, is performed to remove the resist 704 and release layer 702 thereunder to form the structure shown in FIG. 9F. Next, a second RIE step is performed to remove the various DLC layers to form the structure shown in FIG. 9G. Then, other layers may be formed on this structure, such as a trailing shield, etc.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
 a main pole configured to emit a recording magnetic field for affecting a magnetic medium;
 a spin torque oscillator (STO) device in electrical communication with and positioned above the main pole in a track direction, the STO device being configured to generate a high-frequency magnetic field which is superimposed with the recording magnetic field in order to record data to the magnetic medium when current flows to the STO device from a first side to a second side thereof; and
 a heat sink positioned adjacent or directly adjacent at least a third side of the STO device, the heat sink being configured to reduce a temperature of the STO device when current flows to the STO device, the third side of the STO device extending between the first and second sides of the STO device.

2. The magnetic head as recited in claim 1, wherein the heat sink comprises Cu, Au, Ag, Al, diamond, and/or graphene.

3. The magnetic head as recited in claim 1, wherein at least a portion of the heat sink is positioned behind the STO device relative to a media facing surface of the magnetic head in an element height direction perpendicular to the media facing surface of the magnetic head.

4. The magnetic head as recited in claim 1, wherein the heat sink is positioned on both sides of the STO device in a cross-track direction along a media facing surface of the magnetic head.

5. The magnetic head as recited in claim 4, wherein a portion of the heat sink is further positioned behind the STO device relative to the media facing surface of the magnetic head in an element height direction perpendicular to the media facing surface of the magnetic head.

6. The magnetic head as recited in claim 1, wherein the heat sink comprises a nonmagnetic material selected from a group consisting of: $TiO_2$, TiN, $Al_2O_3$, AlN, $SiO_2$, $Si_3N_4$, and SiC.

7. The magnetic head as recited in claim 6, wherein the heat sink has a deposition thickness that is greater than a deposition thickness of the STO device.

8. The magnetic head as recited in claim 1, wherein the heat sink is electrically insulating.

9. The magnetic head as recited in claim 1, further comprising an insulating layer configured to electrically insulate the main pole from at least one of: an electrode positioned above the STO device in the track direction, and the heat sink.

10. The magnetic head as recited in claim 9, wherein the insulating layer is positioned between the STO device and the heat sink.

11. The magnetic head as recited in claim 9, wherein the insulating layer is positioned between the main pole and the heat sink.

12. The magnetic head as recited in claim 9, wherein the insulating layer is positioned between the electrode and the heat sink.

13. The magnetic head as recited in claim 9, wherein the electrode is a trailing shield positioned above the STO device in the track direction, and further comprising a leading edge shield positioned below the main pole in the track direction.

14. A magnetic data storage system, comprising:
 at least one magnetic head as recited in claim 1;
 the magnetic medium;
 a drive mechanism for passing the magnetic medium over the at least one magnetic head; and
 a controller electrically coupled to the at least one magnetic head for controlling operation of the at least one magnetic head.

15. A method for forming a magnetic head, the method comprising:
 forming a main pole configured to emit a recording magnetic field for affecting a magnetic medium;
 forming a spin torque oscillator (STO) device above the main pole in a track direction, the STO device being in electrical communication with the main pole; and
 forming a heat sink near to the STO device configured to reduce a temperature of the STO device when current flows to the STO device, the heat sink being formed behind the STO device in an element height direction perpendicular to a media facing surface of the magnetic head, and/or on both sides of the STO device in a cross-track direction at the media facing surface of the magnetic head.

16. The method as recited in claim 15, wherein the heat sink comprises a multi-layer structure comprising at least one of: Cu, Au, Ag, and Al, and at least one of: diamond, graphene, $TiO_2$, TiN, $Al_2O_3$, AlN, $SiO_2$, $Si_3N_4$, and/or SiC.

17. The method as recited in claim 15, wherein the heat sink is electrically insulating and does not provide a bypass for current that flows to the STO device to produce a spin polarization effect.

18. The method as recited in claim 15, further comprising forming an insulating layer configured to electrically insulate the main pole from at least one of: an electrode formed above the STO device in the track direction, and the heat sink, wherein the insulating layer is formed either between the STO device and the heat sink, between the main pole and the heat sink, or between the electrode and the heat sink.

19. The method as recited in claim 18, wherein the heat sink has a deposition thickness that is greater than a deposition thickness of the STO device, and wherein the heat sink and the insulating layer are formed via package formation of a refill material and heat sink material.

20. A magnetic head, comprising:
 a main pole configured to emit a recording magnetic field for affecting a magnetic medium;
 a spin torque oscillator (STO) device in electrical communication with and positioned above the main pole in a track direction, the STO device being configured to generate a high-frequency magnetic field which is superimposed with the recording magnetic field in order to record data to the magnetic medium when current flows to the STO device from a first side to a second side thereof;

a heat sink positioned adjacent or directly adjacent at least a third side of the STO device, the heat sink being configured to reduce a temperature of the STO device when current flows to the STO device, the third side of the STO device extending between the first and second sides of the STO device; and an insulating layer configured to electrically insulate the main pole from at least one of: an electrode positioned above the STO device in the track direction, and the heat sink, wherein at least a portion of the heat sink is positioned behind the STO device relative to a media facing surface of the magnetic head in an element height direction perpendicular to the media facing surface of the magnetic head.

* * * * *

UNITED STATES PATENT AND TRADEMARK OFFICE
CERTIFICATE OF CORRECTION

| | |
|---|---|
| PATENT NO. | : 8,995,088 B1 |
| APPLICATION NO. | : 14/060504 |
| DATED | : March 31, 2015 |
| INVENTOR(S) | : Carl Boone et al. |

Page 1 of 1

It is certified that error appears in the above-identified patent and that said Letters Patent is hereby corrected as shown below:

In the specification:

col. 2, line 9 replace "W/in" with --W/m--.

Signed and Sealed this
Fifteenth Day of September, 2015

Michelle K. Lee
*Director of the United States Patent and Trademark Office*